(12) United States Patent
McKee et al.

(10) Patent No.: US 8,373,550 B2
(45) Date of Patent: Feb. 12, 2013

(54) DOOR ASSIST SYSTEM CONTROLLER AND METHOD

(75) Inventors: Michael McKee, Aurora, IL (US); Nick Scholtes, Shorewood, IL (US); John Hayden, Aurora, IL (US)

(73) Assignee: Control Solutions LLC, Aurora, IL (US)

( * ) Notice: Subject to any disclaimer, the term of this patent is extended or adjusted under 35 U.S.C. 154(b) by 1107 days.

(21) Appl. No.: 12/194,966

(22) Filed: Aug. 20, 2008

(65) Prior Publication Data
US 2012/0180391 A1  Jul. 19, 2012

(51) Int. Cl.
- B60R 25/10 (2006.01)
- G05B 5/00 (2006.01)
- B60J 5/00 (2006.01)
- E05F 11/00 (2006.01)

(52) U.S. Cl. .............. 340/426.28; 340/426.24; 340/438; 318/446; 296/155; 296/146.4; 49/360

(58) Field of Classification Search .................. 340/435, 340/455, 457, 9.1, 10.5, 12.5, 12.513, 426.28, 340/5.61, 5.72, 426.24, 438; 320/104, 105, 320/133; 318/266, 286, 446, 443, 444, 445; 296/146.4, 146.9, 155; 70/237; 49/26, 360
See application file for complete search history.

(56) References Cited

U.S. PATENT DOCUMENTS

| | | | | |
|---|---|---|---|---|
| 3,934,925 A | | 1/1976 | Fetsch | |
| 4,831,509 A | * | 5/1989 | Jones et al. | 700/90 |
| 5,074,073 A | * | 12/1991 | Zwebner | 49/26 |
| 5,224,364 A | * | 7/1993 | Claar et al. | 70/237 |
| 5,389,920 A | * | 2/1995 | DeLand et al. | 340/12.5 |
| 5,684,470 A | * | 11/1997 | DeLand et al. | 340/12.5 |
| 5,734,727 A | | 3/1998 | Flaherty et al. | |
| 6,037,727 A | * | 3/2000 | Kawanobe et al. | 318/286 |
| 6,157,317 A | * | 12/2000 | Walker | 340/7.1 |
| 6,164,015 A | * | 12/2000 | Kawanobe et al. | 49/360 |
| 6,256,932 B1 | | 7/2001 | Jyawook et al. | |
| 6,290,269 B1 | * | 9/2001 | Bodley-Scott et al. | 292/216 |
| 6,323,761 B1 | * | 11/2001 | Son | 340/426.35 |
| 6,404,163 B1 | * | 6/2002 | Kapsokavathis et al. | 320/104 |
| 7,210,731 B2 | * | 5/2007 | Ichinose et al. | 296/155 |
| 7,243,461 B2 | * | 7/2007 | Rogers et al. | 49/360 |
| 7,307,395 B2 | * | 12/2007 | Bouamra et al. | 318/445 |
| 7,525,286 B2 | * | 4/2009 | Wang | 320/133 |
| 7,726,722 B2 | * | 6/2010 | Ray | 296/146.4 |
| 7,808,197 B2 | | 10/2010 | Kimura et al. | |
| 2004/0090122 A1 | * | 5/2004 | Huber et al. | 307/10.2 |
| 2006/0006692 A1 | | 1/2006 | Takahashi et al. | |
| 2006/0181108 A1 | | 8/2006 | Cleland et al. | |
| 2007/0063527 A1 | | 3/2007 | Ueda et al. | |

(Continued)

OTHER PUBLICATIONS

Non-Final Office Action Mailed Feb. 24, 2011 for U.S. Appl. No. 12/194,895.

*Primary Examiner* — Van T. Trieu

(74) *Attorney, Agent, or Firm* — McCracken & Frank LLC

(57) ABSTRACT

A controller for a door system and an associated method of operation for actuating a door. The controller may be electrically coupled with a motor, an outer door switch and an inner door switch. The controller, activates a motor assist and may maintain a desirable current supply to the motor assist. Determining a relative position of the door and determining whether movement of the door is obstructed is performed. The controller actuates the door to an appropriate position and determines whether door operation exceeds a maximum time threshold. The controller may be configured to deactivate the motor assist once the door reaches an appropriate position or the door operation exceeds the maximum time threshold.

41 Claims, 12 Drawing Sheets

U.S. PATENT DOCUMENTS

| | | |
|---|---|---|
| 2007/0296242 A1 | 12/2007 | Frommer et al. |
| 2008/0238135 A1 | 10/2008 | Takeda et al. |
| 2008/0296929 A1 | 12/2008 | Suzuki et al. |
| 2009/0000059 A1 | 1/2009 | Nakaura et al. |
| 2009/0072580 A1 | 3/2009 | Wojtach, Jr. |
| 2010/0219844 A1 | 9/2010 | Sakamaki et al. |

* cited by examiner

DOOR ASSIST SYSTEM CONTROLLER AND METHOD

FIELD OF THE INVENTION

This invention relates to a door assist system to aid a user in opening doors by providing a power assist and controls to operate the power assist. In particular, the invention relates to a door assist system adapted for use in a motor vehicle, such as an armored motor vehicle used in military operations, to aid the user in opening doors by providing a power assist and controls to operate the power assist.

BACKGROUND

To protect military personnel during combat, military vehicles are provided with layers of armor. In some vehicles, the armor may be provided on the vehicle in the factory during manufacture of the vehicle. However, it has become increasingly common for armor to be applied to existing vehicles in the field.

The military started adding armor to its High Mobility Multipurpose Wheeled Vehicle, or "HMMWV" or "Humvee," well before Operation Iraqi Freedom, but attacks from small arms, rocket-propelled grenades and "improvised explosive devices," or IEDs in military parlance, prompted the military to increase protection for vehicles already in the field. The "up-armored" HMMWV can weigh thousands of pounds more than the standard HMMWV and includes several hundred pound steel-plated doors. Such heavy armored doors make opening and closing the doors increasingly difficult for personnel.

There is a need for a mechanism to assist with moving heavy armored doors on military vehicles. There is also a need for such mechanisms to be able to retrofit to existing vehicles that are up-armored in the field.

SUMMARY

A system for providing assistance in opening doors, such as heavily armored vehicle doors, is described herein. In particular, a door assist system configured as a power assisted door opening and closing system for vehicles is provided. The system is intended to provide the occupants of the vehicle relief from manually maneuvering the vehicles heavily armored entry/exit doors in a rapid and safe manner. The door assist system contains several operating modes. The operating modes may be triggered by the action of an individual.

In one example embodiment, a controller is provided for a motorized door assist system for automating motion of a door relative to a door frame of a vehicle. The door assist system comprises a drive system coupled to the door and the door frame of the vehicle. The drive system moves the door between a closed door position and an open door position. A controller is electrically connected to the drive system. An electrical power supply in combination with both the controller and a motor of the drive system may be provided.

The controller, for example, may be connected with respect to a dedicated power supply and a motor. The controller maintains a desirable voltage level of the power supply to the motor from the dedicated power supply and determines a relative position of the door. As a result of such determinations, the controller may stop the motor if movement of the door is obstructed or exceeds operation for a preset time threshold. In addition, a memory may be associated with the controller for storing one or more presets of the door position wherein the one or more presets are stored using at least one of an operable handle or a switch associated with the vehicle door. The controller may further be connected between the dedicated power supply and a vehicle battery and include a circuit for maintaining a desired current to a motor assist.

DETAILED DESCRIPTION

A door assist system is provided that relieves vehicle occupants of having to manually maneuver a vehicle's heavily armored entry/exit doors in a rapid and safe manner. While the description below is made with reference to armored military vehicles, it should be appreciated that the systems described may be applied to other types of doors.

It should be noted that the basic system components remain the same for all four doors of the vehicle. However, because of the differences in the manner that each of the vehicle doors open (i.e. left doors open to the left, right doors to the right, front doors are geometrically different from back doors) the implementation of the door assist system on each of the four doors is slightly different. All operating modes of the system can be implemented with various and alternative mechanical implementations.

Figure 1:
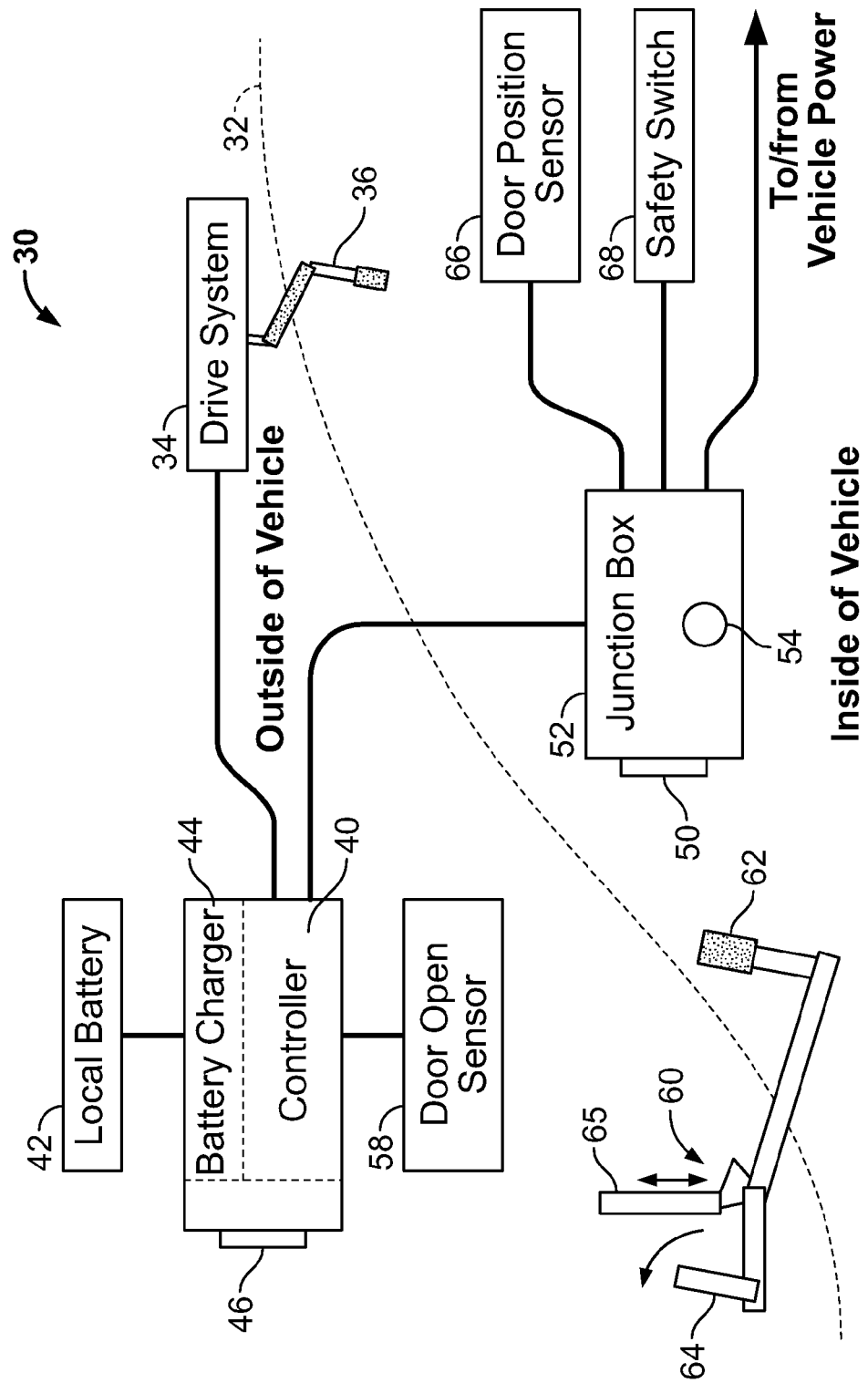
FIG. 1 is a schematic diagram of a door assist system according to one embodiment.

FIG. 1 illustrates a general schematic illustration of a motorized door assist system 30 for moving a door relative to a door frame of a vehicle. The door assist system 30 is designed to assist a single door, and each door in a vehicle can be equipped with a separate one of door assist system 30. A dashed line 32 indicates a division of the recited components that are inside (below line 32) and outside (above line 32) of the vehicle.

The motorized door assist system 30 includes a drive system 34 coupled to the door and the door frame of the vehicle. As used herein, "door frame" refers to any part of the vehicle adjacent the door or door opening, including without limitation the vehicle frame or vehicle roof. The drive system 34, when activated, moves the door between a closed door position and an open door position. The drive system 34 includes a motor and an actuator device, such as a hydraulic piston or rack and pinion gear that extends between the door and the vehicle. The activated motor in turn moves the piston or gears which causes movement of the door relative to the vehicle frame. When retrofitted to an existing vehicle, the drive system 34 desirably includes the motor and any accompanying gearing attached to an upper side of the external side of the door. The actuator device extends from the motor to the vehicle, e.g., the vehicle frame or roof. The actuator device is connected to the vehicle by, for example, a bracket and clevis pin. In another embodiment, the motor is mounted on the vehicle and the actuator device extends from the motor to the door. As will be appreciated by those skilled in the art following the teachings herein provided, various and alternative configurations are available for the drive system, and components thereof, depending on, for example, the design of the vehicle.

The drive system 34 may selectively include a manual override actuator, illustrated in FIG. 1 as a manual override lever 36. The manual override lever 36 is located on the top inside of the door and is connected with the external drive system 34. Actuating (e.g., pulling or rotating) the lever disengages the drive system, e.g., disengages the drive system actuator from the drive motor or disengages a mechanical gear train of a motor/gear drive system, and allows the occupant to manually open and close the door.

A controller 40 is electrically connected to the drive system 34. The controller 40 is the brain of the door assist system 30, and can include a circuit board and memory component. All system stimuli (i.e., switches, sensors, power, etc.) are desirably feed to the controller 40. Based on the values read from the various inputs discussed below, the controller 40 may or may not take action. For instance, should the door be closed and the controller 40 receives a signal to open the door, the controller 40 will supply power to the drive system 34 to open the door. The controller 40 monitors the various inputs to determine when to stop supplying power to the drive system 34. In another example, if the controller 40 receives a signal to open the door, but is also receiving a signal input that the door is at maximum open, the controller 40 will not provide power to the drive system 34.

The door assist system 30 may contain a separate rechargeable electrical power supply, such as local battery 42, at each door, in combination with each controller 40. In another embodiment, the local battery 42 and controller 40 can be mounted onto or integrated with the vehicle itself. No user interaction is required regarding the battery 42 during operations. The battery 42 or controller 40 can include a battery power level indicator, such as an LED panel, to indicate the remaining power supply. In the embodiment of FIG. 1, the controller 40 is connected to or includes a battery charger 44 to recharge the battery from the vehicle's power system. The condition upon the battery 42 being recharged can vary. For example, the battery 42 can be recharged whenever the vehicle is in operation (i.e., when the alternator is in operation), every time the local battery 42 is used or cycled (e.g., the battery is recharged to full power after every door opening or closing), upon reaching a predetermined power level, or upon complete discharge. A trickle charge can be used to charge the battery 42 when the vehicle is off and if the battery 42 is in danger of being depleted. In one embodiment, the charge from the vehicle battery is dependent upon the vehicle battery having a sufficient, predetermined charge, so that the system does not deplete the vehicle battery and render the vehicle inoperable.

As will be appreciated by those skilled in the art following the teachings herein provided, various and alternative powering schemes can be used to power the door assist system. For example, in other embodiments, the door assist system 30 may pull primary power from the vehicle battery, and use the local battery 42 as a back-up power source.

The door assist system 30 includes an external close switch 46 mounted to an external side of the door, or otherwise outside the vehicle, and in communication with the controller 40. When activated, the external close switch 46 signals the controller 40 to move the door toward the closed door position. In the example seen in FIG. 1, the external close switch 46 is integrated in the same housing as the controller 40, and is embodied as a button on the side of the housing of the controller 40. The external close switch 46, as with other switches of this invention, is not limited to any particular type of switch, and can be, for example, a spring loaded toggle switch.

The door assist system 30 further includes an internal close switch 50 mounted to an internal side of the door, or otherwise inside the vehicle, and in communication with the controller 40. When activated, the internal close switch signals the controller 40 to move the door toward the closed door position. In the example seen in FIG. 1, the internal close switch 50 is integrated with a junction box 52, and is shown as a button on the side of the junction box 52.

The junction box 52 is located on the inside of the vehicle, desirably approximately in the middle of the door. The junction box 52 desirably serves as a gathering point for the cabling from internal components. The junction box 52 also houses a door stop switch 54. When the door stop switch 54 is depressed it deactivates any opening or closing operation, and will optionally open a stopped closing door a moderate amount, such as to allow any obstruction to be removed. When the door stop switch 54 is released, no further movement will take place. If desired, the occupant must initiate a new door opening or closing action.

The door assist system 30 includes a door open sensor 58 in combination with the controller 40 and the door latch mechanism 60. As shown in the example of FIG. 1, the door latch mechanism 60 includes an internal latch actuator 62 and an external latch actuator 64. In one embodiment, the door open sensor 58 is a magnetically activated switch, e.g., a Hall Effect sensor, that is triggered by the movement of a magnet embedded in the door latch mechanism 60. When the door latch mechanism 60 is activated to open the door, the portion of the mechanism containing the embedded magnet is moved closer to the door open sensor 58, activating the sensor. When the door latch mechanism 60 is released the embedded magnet will be moved away from the door open sensor, deactivating the door open sensor 58. In up-armored M1114 HMMWV, a multi-point locking system is commonly employed. The latch actuators 62 and 64 are connected to a vertical component 65 connecting an upper and lower latching point. In such a latch mechanism, the magnet can be attached to the vertical component 65, which moves vertically toward the door open sensor 58 upon actuation of either of actuators 62 and 64.

A door position sensor 66 is mounted on the inside of the vehicle close to the door hinge. The door position sensor 66 is mounted so that one end or part of the sensor 66 is attached to the door assembly while the other end or part is attached to the door frame. The door position sensor 66 detects movement and position of the door and relays this information to the controller 40, via junction box 52 in the example seen in FIG. 1. In one embodiment, the door position sensor 66 includes a Hall Effect sensor. The controller 40 uses the provided information to determine the position of the door.

In one embodiment, the door assist system 30 includes a safety switch 68. The safety switch 68 activates should the door assist system 30 be closing the door and any part of the switch 68 is depressed. When depressed the switch 68 will cause the door assist system 30 to immediately cease closing the door and, optionally, will moderately open the door. This safety mechanism is intended to prevent door closures while obstructions remain between the door and the door frame. The safety switch 68 can include one or more sensors strategically placed around at least portions of the outside perimeter of the door. In one embodiment, the safety switch 68 includes a multi-segmented, large surface area, single pole switch that is located around at least portions of the inside perimeter of the door.

Figure 2:
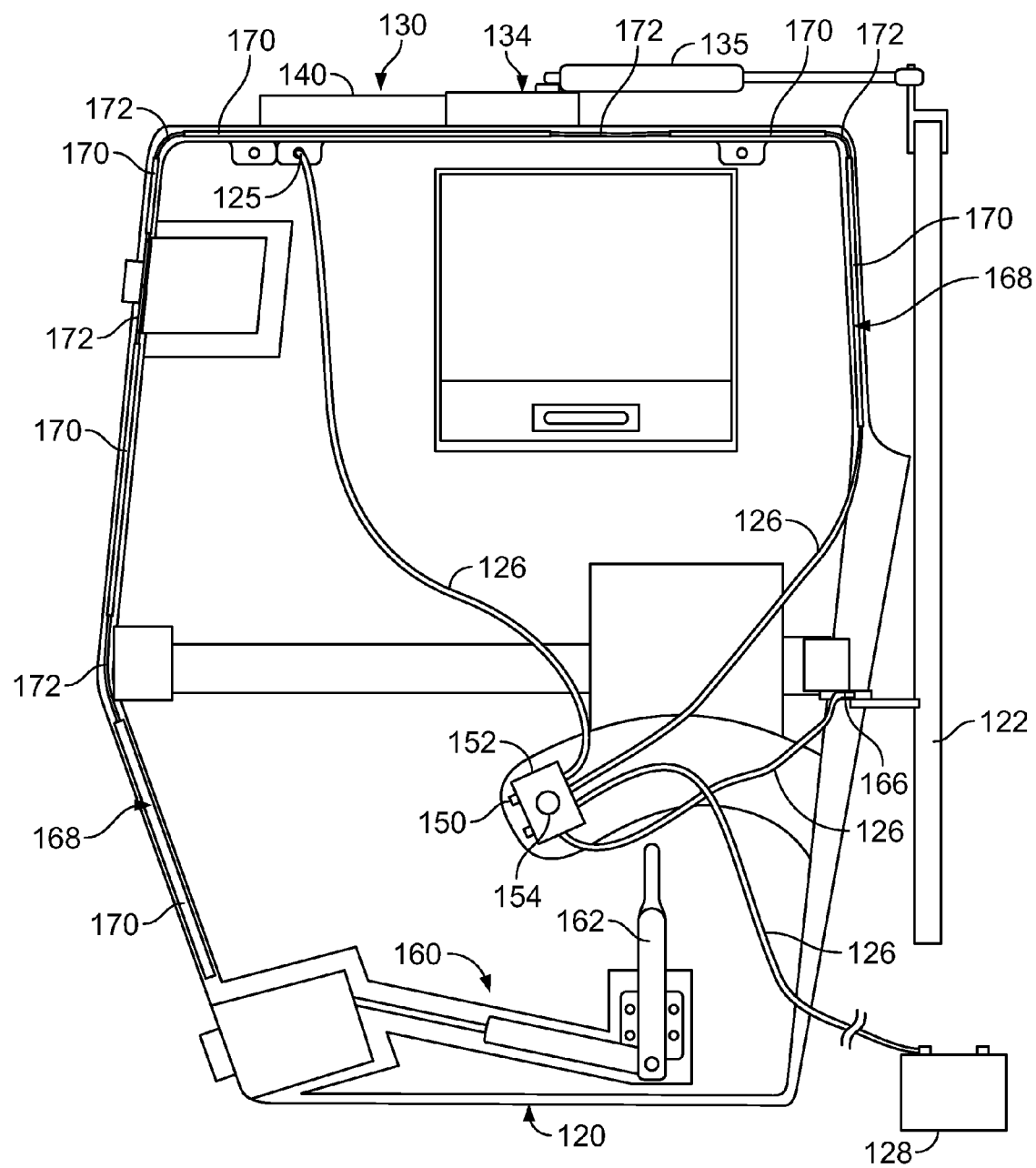
FIG. 2 is a plan perspective view of a door of a vehicle adapted with a door assist system according to another embodiment.
Figure 3:
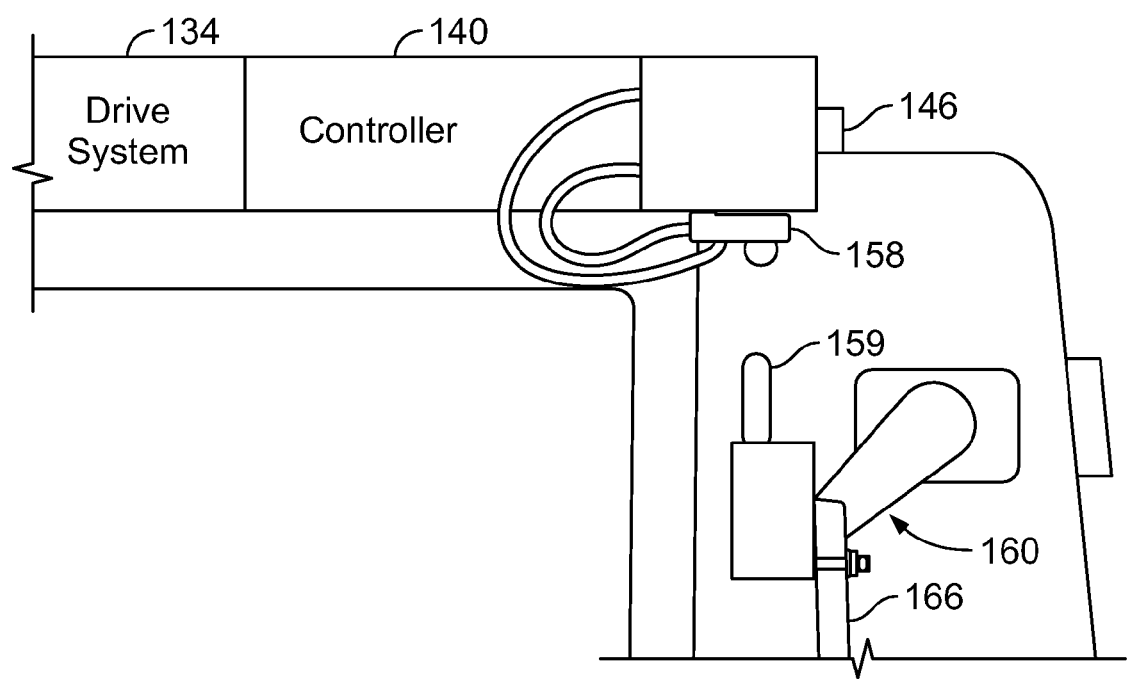
FIG. 3 is a plan perspective view of a portion of the outer side of the door of FIG. 2.

As discussed above, military vehicles are often up-armored in the field, and a retrofit kit is contemplated for the door assist system provided herein. FIGS. 2 and 3 generally illustrate a representative HMMWV door 120 (not to scale or shown in full detailed) retrofitted with a door assist system 130. The door 120 includes a door latch mechanism 160 coupled to the door. The door latch mechanism 160 includes an internal door latch actuator 162. The door 120 is connected to a vehicle frame, generally illustrated as frame 122, by a hinge (not shown).

Figure 4:
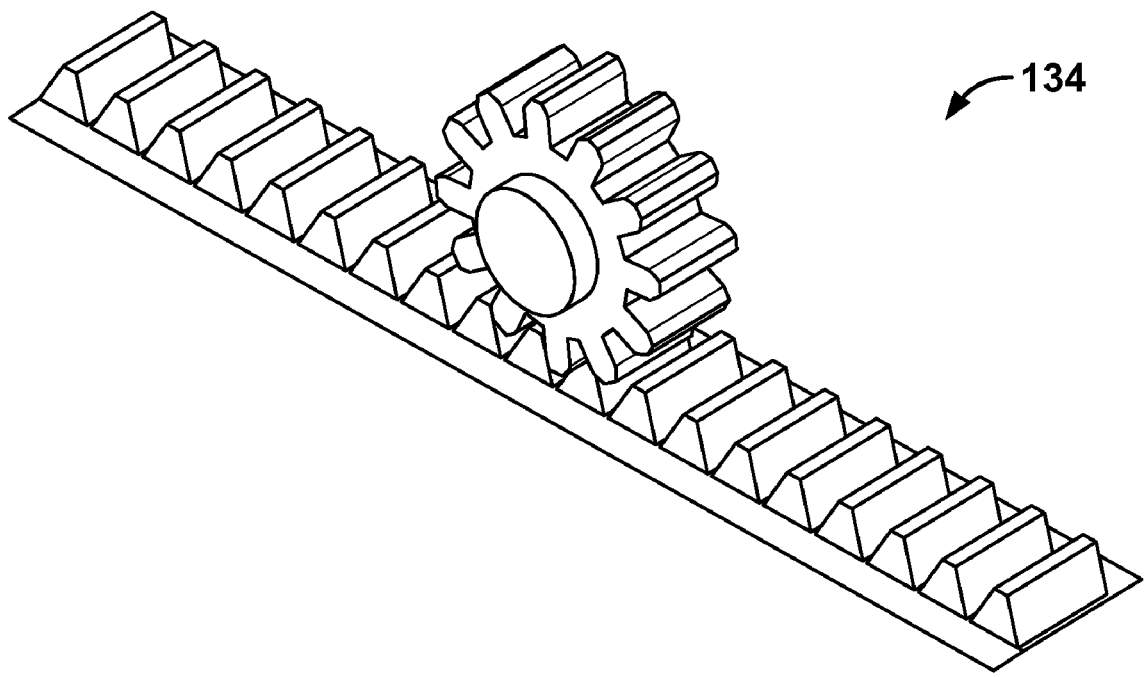
FIG. 4 illustrates a general schematic of an exemplary rack and pinion gear.

In the embodiment shown in FIG. 2, a drive system 134 is a hydraulic motor. The hydraulic motor includes a hydraulic piston 135 having a first end attached to the door 120 and a second end attached to the door frame 122. As discussed above, alternative drive systems are available, such as linear actuators, pneumatic drive systems (either dynamic using an air source or static through a pressure cylinder), and geared drive systems, such as the rack and pinion drive system 134 shown in FIG. 4.

The drive system 134, a control box for controller 140, and local electrical power supply (not shown) can be attached to the external side of the door by various means, such as, without limitation a welded or bolted on attachment plate. Desirably, the external components of the system are covered to protect them from battlefield damage. As shown in FIG. 3, the control box for controller 140 includes a button operated external close switch 146 for initiating the closing of the door 120 from outside of the vehicle.

Referring back to FIG. 2, a junction box 152 includes an internal close switch 150 and a door stop switch 154. The junction box 152 is electrically connected to the controller 140, as well as door position sensor 166, vehicle battery 128, and a safety switch 168 by electrical connectors 126. The connector 126 extending between the controller 140 and the junction box 152 extends through an opening 125 in the door. It is generally preferred to limit the amount of holes drilled through the door 120, so as to not compromise the armor applied to the door 120.

The safety switch 168 extends around the inside perimeter of the door 120. The safety switch 168 is a multi-segmented single pole switch. Sensor segments 170 of the safety switch 168 are strategically placed depending on need in areas where obstructions to the door closing likely will occur. The sensor segments 170 are connected to electrical connections (e.g., wires or cables) 172. The segments 170 and the connectors 172 can be secured to the door 120 by any suitable means, such as adhesives or clips. When the door is closing and any one of the segments 170 are contacted, the safety switch 168 sends a door stop signal to the controller 140 to stop the closing motion to allow the obstruction to be removed.

FIG. 3 shows a portion of the external side of the door. A door open sensor 158 is connected to the controller 140 for detecting whether the door latch mechanism 160 is in a latched state or an unlatched state. A magnet 159 is bolted to a vertical component 166 of the latch mechanism 160. As discussed above, when the latch mechanism 160 is activated to open the door, the magnet 159 is moved closer to the door open sensor 158, which signals the controller 140 to activate the drive system 134 to open the door 120.

Figure 5:
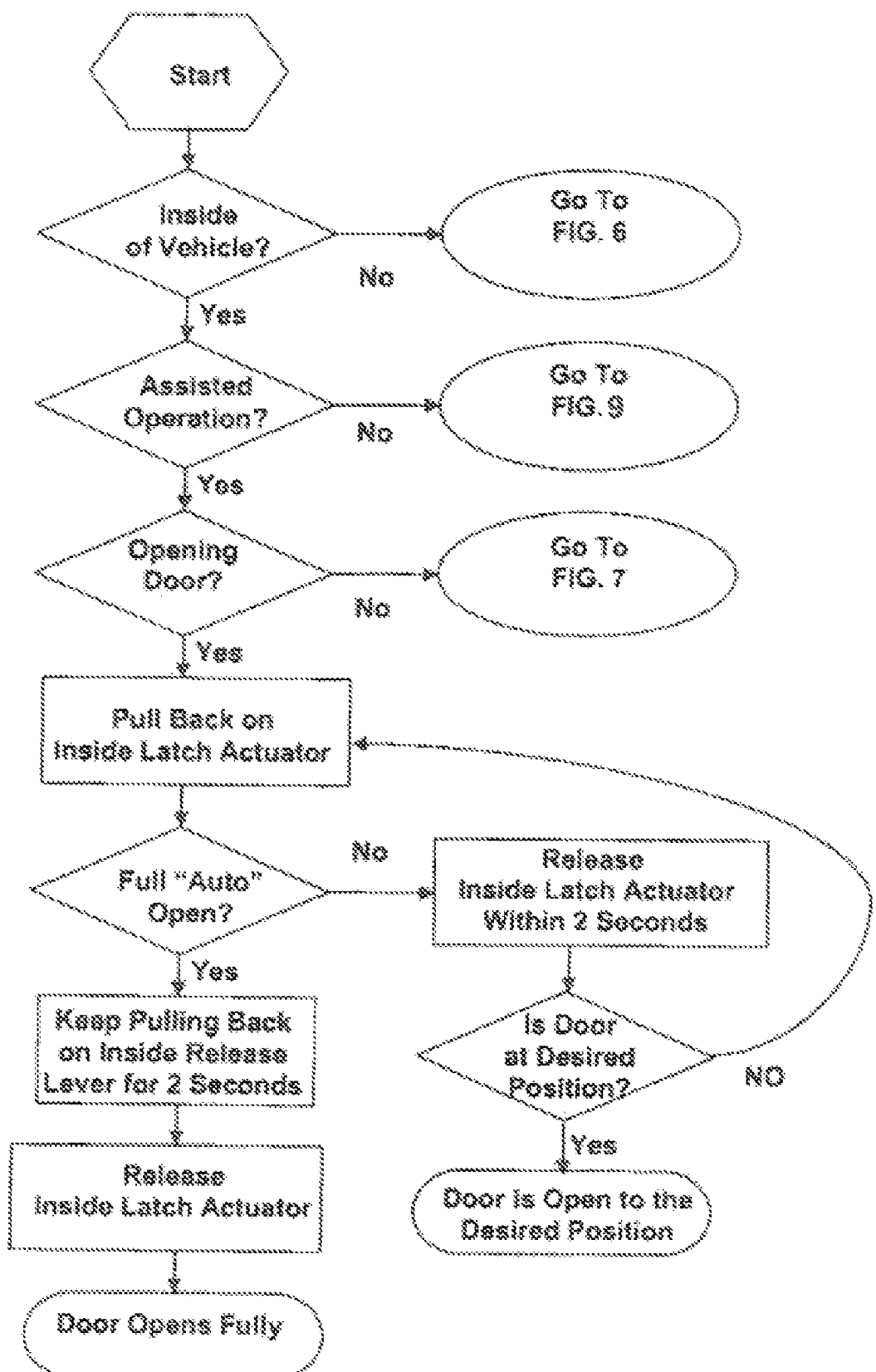
FIGS. 5-10 are logic sequence diagrams illustrating overviews of methodologies for controlling an exemplary door assist system.

FIGS. 5-10 are flow charts illustrating the operation of an exemplary door assist system as described above in FIGS. 1-3. Referring to FIG. 5, to open the door from the inside, the vehicle occupant simply pulls back on the internal latch actuator. The door will immediately begin to open by the drive system. Should the occupant quickly release the internal latch actuator, the door will cease opening immediately. Should the occupant after initial pull back on the internal latch actuator maintain that position for a predetermined time, such as a minimum of 2 seconds, the door will be opened fully by the door assist system regardless of whether or not the occupant continues to pull back on the internal latch actuator. In one embodiment, the occupant can determine when the door assist system has achieved the "Auto" mode by a noticeable speed up of the door opening. The predetermined times may user-programmable, such as in the field and/or at installation, depending on need.

Figure 6:
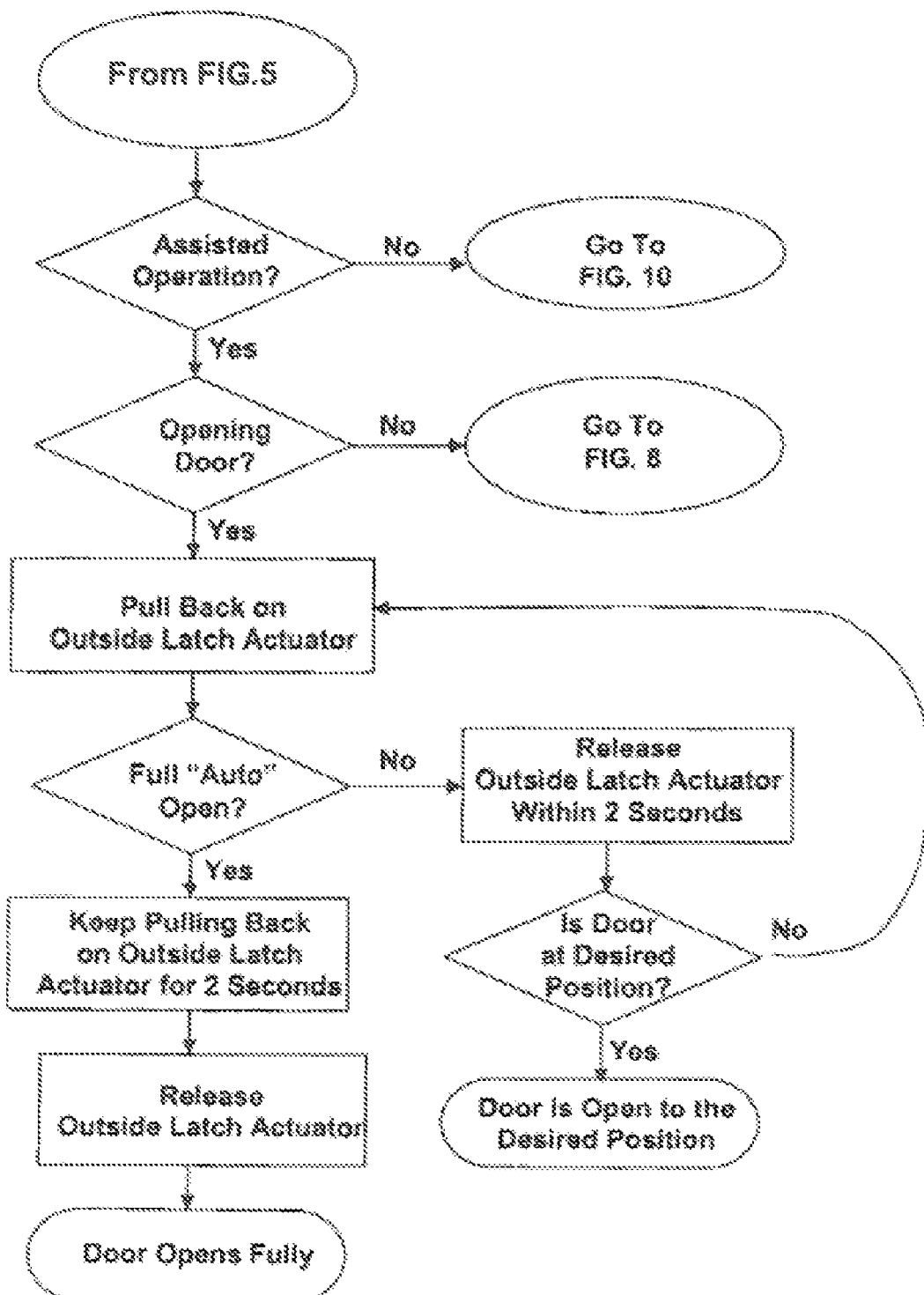

Referring to FIG. 6, to open the door from the outside, the occupant simply pulls back on the external latch actuator. The door will immediately begin to open. Should the occupant quickly release the external latch actuator, the door opening will cease immediately. Should the occupant after initial pull back on the external latch actuator maintain that position for a predetermined, and optionally user-programmable, time, such as a minimum of 2 seconds, the door will be opened fully by the door assist system regardless of whether or not the occupant continues to pull back on the external latch actuator. Again, the occupant can determine when the door assist system has achieved "Auto" mode by a noticeable speed up of the door opening.

Figure 7:
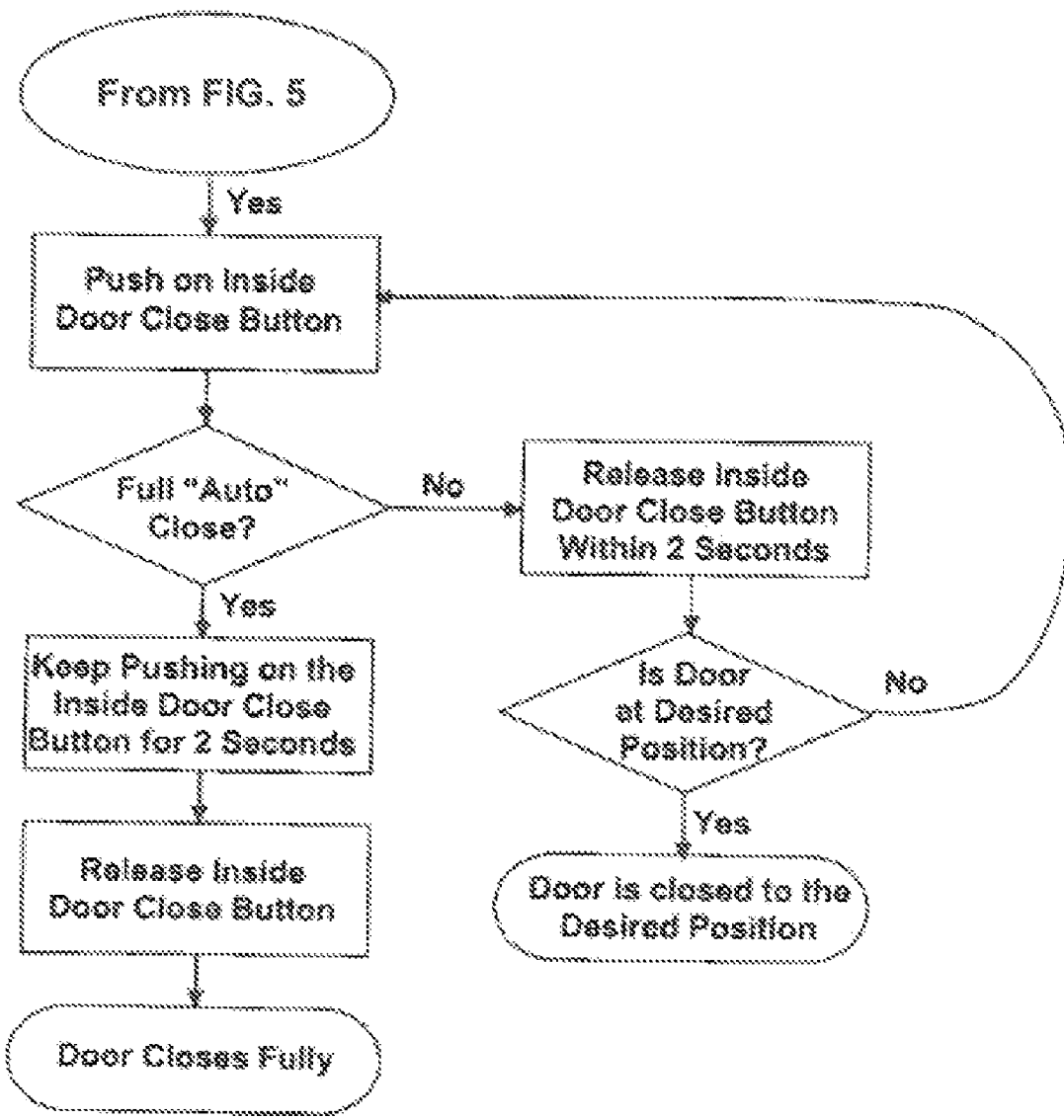

Referring to FIG. 7, to close and latch the door from the inside of the vehicle, the occupant simply presses the internal close switch button (located on the side of the junction box in FIGS. 1-3). The door will immediately begin closing. Should the occupant quickly release the close switch, the door will cease closing. If after initial depression of the internal close switch, the occupant continues to depress the internal close switch for a predetermined, and optionally programmable, time, such as a minimum of 2 seconds, the door will automatically fully close regardless of whether or not the occupant continues to depress the internal close switch. The occupant can detect when the door closing has entered into the "Auto" mode by the noticeable speed increase of the door closing.

Figure 8:
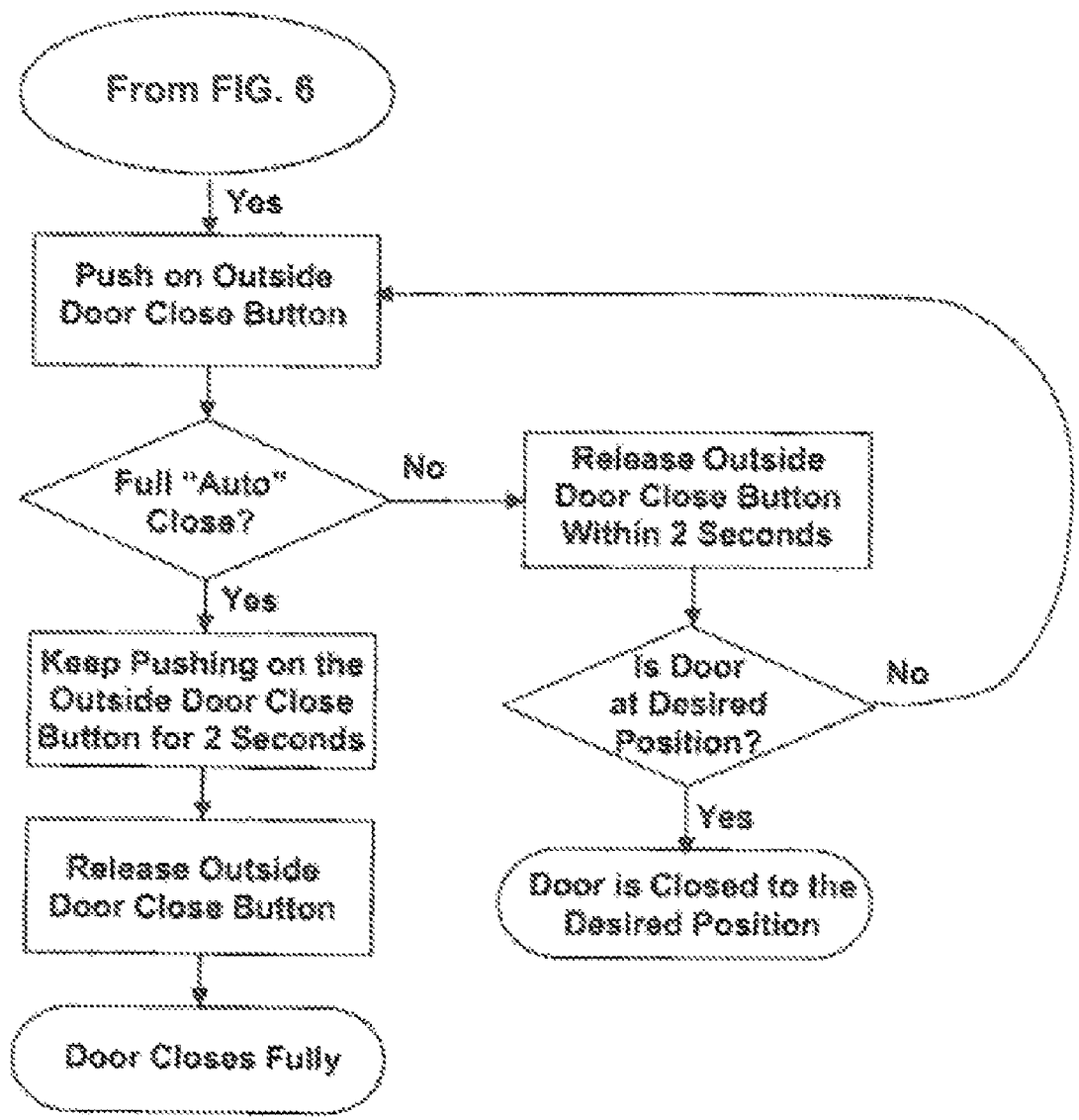

Referring to FIG. 8, to close and latch the door from the outside of the vehicle, the occupant simply presses the external close switch button located on the side of the control box located at the top of the door. The door will immediately begin closing. Should the occupant quickly release the switch, the door will cease closing. If after initial depression of the external close switch button, the occupant continues to depress the external close switch for a predetermined, and optionally user-programmable, time, such as a minimum of 2 seconds the door will automatically fully close regardless of whether or not the occupant continues to depress the external close switch button. The occupant can detect when the door closing has entered into the "Auto" mode by the noticeable speed increase of the door closing.

Figure 9:
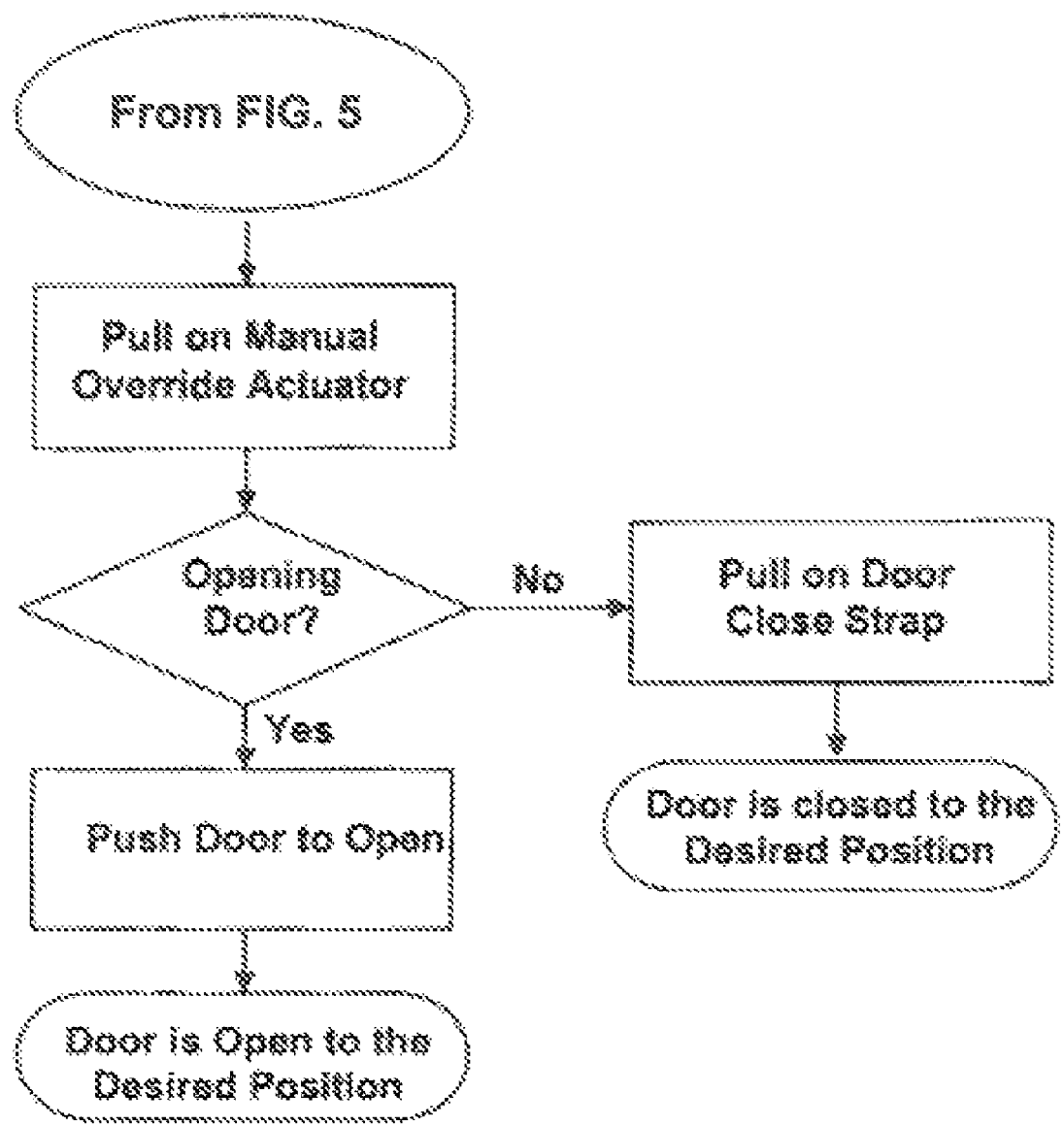

Referring to FIG. 9, to open the door from the inside without the use of the door assist system, the occupant must first disengage the drive system by actuating (e.g., pulling or rotating) the manual override actuator located at the top inside of the door. Once the manual override has been activated, the occupant must pull on the internal actuator and manually push the door open. The door assist system may supply power to the drive system once the latch actuator is pulled, if the battery is charged, but the drive system will not operate due to the manual override. Manually closing the door from the inside also requires the disengagement of the drive system.

Figure 10:
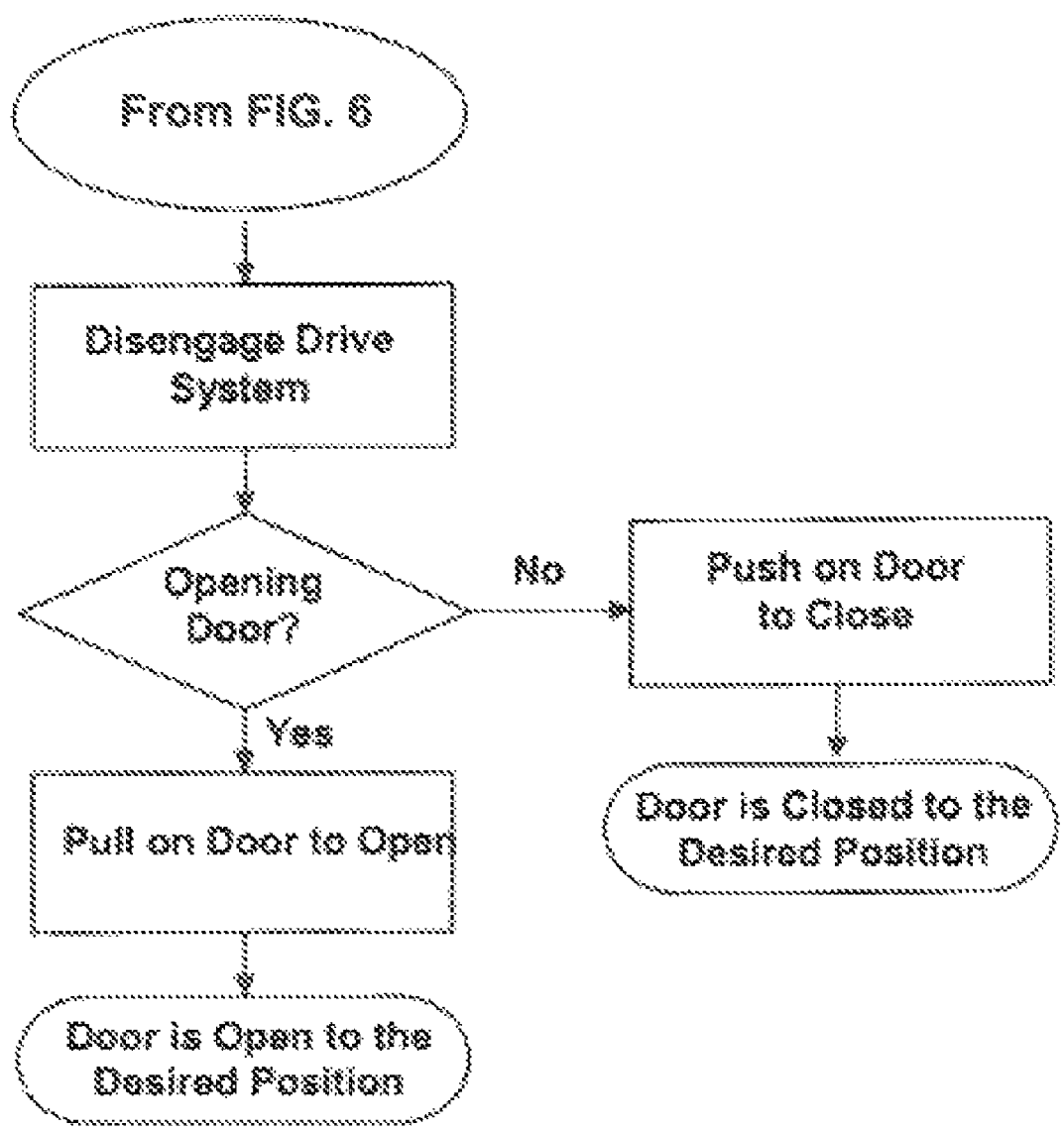

Referring to FIG. 10, to open or close the door from the outside without the use of the door assist system, the drive system must be removed from the vehicle frame. For example, where the drive system is attached to the vehicle from by a Clevis pin, the Clevis pin can simply be removed. The occupant must pull on the external latch actuator to pull the door open.

The door assist system may be programmed to stop at a predetermined open position for the convenience of the occupant. In one embodiment, to program the door open position, the door must first be in the fully opened position. To do this the occupant should pull on either the internal or external latch actuator. The occupant must disengage the drive system by pulling on the manual override actuator located at the top inside of the door. The occupant then manually positions the door to the desired opening. Once the door is positioned to the desired maximum opening, the occupant pulls on and holds either the internal or external latch actuator for a minimum of 30 seconds. The occupant releases the latch actuator and reengages the drive system by releasing the manual override actuator. The door may now be operated normally. When opened, it will not open beyond the programmed maximum value. Should the occupant desire to change the maximum door opening, the procedure will need to be repeated.

The door assist system is desirably designed such that the battery for each door can support approximately 50 full openings or closings on a full charge. Exact capacity may vary due to battery life, temperature, and increased or decreased door loads. In one embodiment, the door assist system desirably does not draw power from the vehicle when the vehicle is not running. The door assist system batteries will only recharge once the engine of the vehicle is operational and its alternator output is, for example, greater than 27 volts. This is intended to prevent excessive door closures and openings from rendering a vehicle inoperative due to a discharged vehicle battery or batteries.

Figure 11:
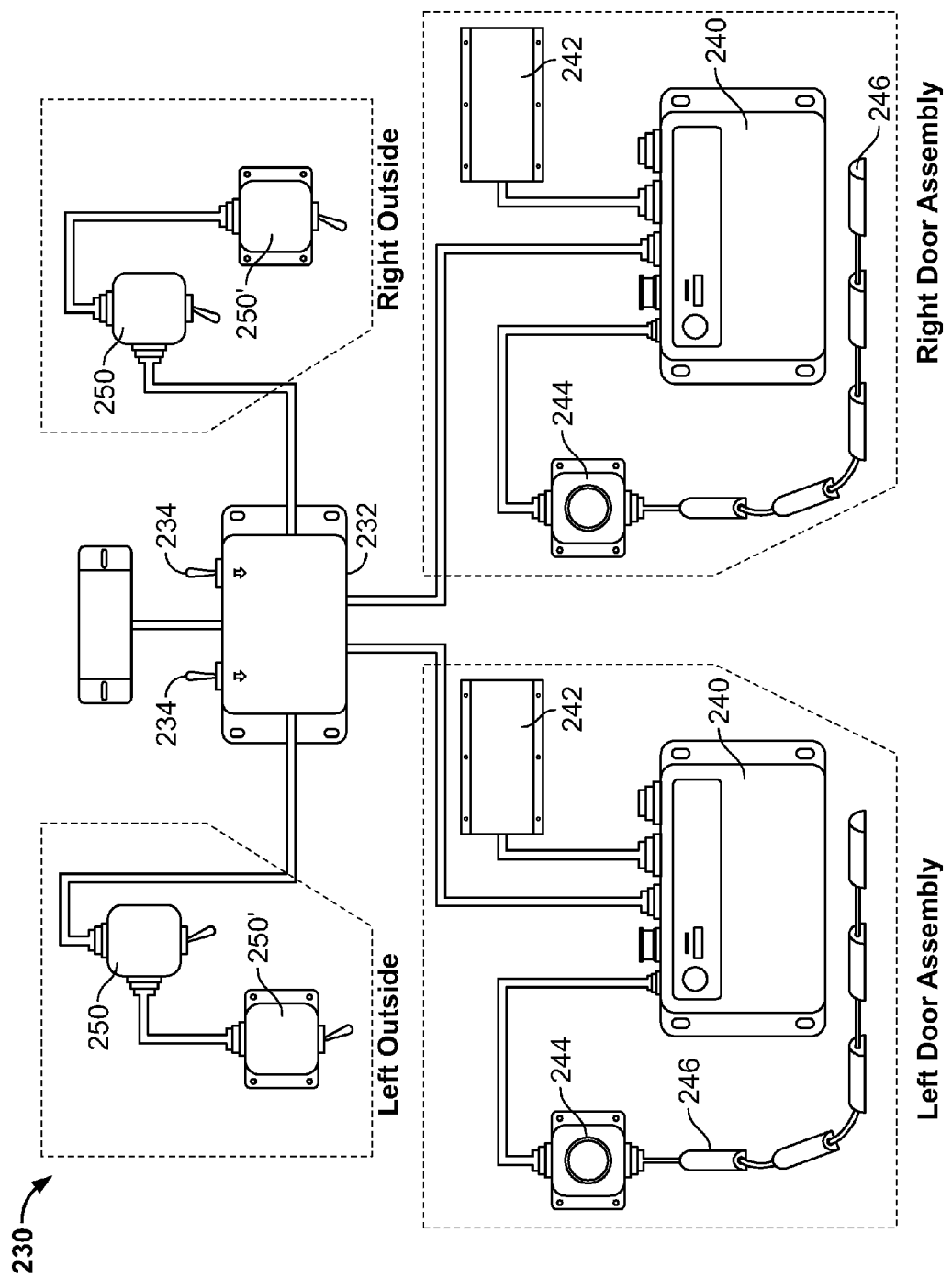
FIG. 11 illustrates an exemplary control system for a door assist system.

FIG. 11 illustrates a further embodiment of a control system for the door assist system. The vehicle illustrated in FIG. 11 is a two-door vehicle, such as Mine Resistant Ambush Protected (MRAP) vehicles, but the control system can be similarly applied and adapted for a four-door vehicle. In FIG. 11, control system 230 includes a vehicle mounted internal switch box 232. The switch box 232, for example, may be centrally located between the two doors, such as on the dash or above the windshield. The switch box 232 includes two internal open/close switches 234, one for each of two doors representatively shown in phantom. In the embodiment of FIG. 11, each switch 234 has at least two positions, one for opening the corresponding door and the other for closing the corresponding door. In one embodiment, the switch box 232 can optionally include two additional lockout switches that, when activated, disable the corresponding external open/close switch 250 (i.e., the driver side lockout switch disables the driver side external open/close switch 250, and the passenger side lockout switch disables the passenger side external open/close switch 250). These lockout switches desirably do not disable the interior internal open/close switches 234, and are used to keep unwanted third parties from being able to open the door from the outside when an operator is inside.

The internal open/close switches 234 each communicate with a corresponding controller 240. Each controller 240 is in communication with a corresponding drive system (not shown) as discussed above, and can be powered by a local battery 242. A door stop switch 244 and a multi-segment sensor safety switch 246 for each door communicate with the corresponding controller 240. The door stop switch 244 is a particularly beneficial safety feature in embodiments where the switches are simply actuated and stay in the actuated position without requiring the operator to hold the switch in the actuated position. In another embodiment, the switch must be maintained in the actuated position by the operator, or the switch will return to a non-actuated position and stop the movement of the door.

A notable difference in this embodiment is that the external open/close switch 250 is routed through the switch box 232. In one embodiment, where the vehicle has additional armor added, and the armor prevents the operator from reaching the external switch 250, an extension switch 250' can be added to connect to the original switch 250. In another embodiment, the external open/close switch may be integrated with the existing vehicle door handle or latch mechanism, without the need for a further added switch.

Figure 12:
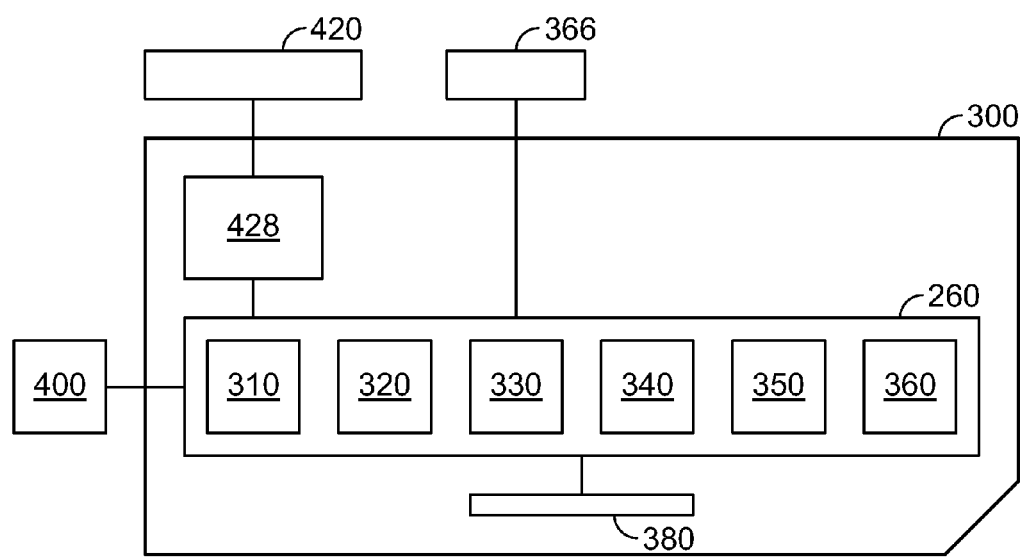
FIG. 12 is a schematic illustrating an example controller according to yet another embodiment.

As described, the example door assist systems preferably include a controller (e.g., controllers 40, 140, 240) for controlling a motor assist, i.e., any system components that provide mechanical, electrical, hydraulic and/or pneumatic assistance, in actuating a door to move between an open position and closed position. The motor assist employed may be activated by the controller to actuate the door and may or may not necessarily include a motor. According to such embodiments as described, the controller operates in connection with an outer door switch (e.g., external close switch 46/146, door open sensor 58/158, external open/close switch 250, or other suitable means) and an inner door switch (e.g., internal door switch 50/150, internal open/close switch 234, or other suitable means). FIG. 12 schematically illustrates a representative controller 260 according to one example embodiment. It is contemplated that controllers 40, 140, and 240 will operate in a similar manner as controller 260, described hereinafter, however, each controller 40, 140, 240 may include more, less or variations of features to those described, depending on need and the design of the vehicle and/or door assist system.

As shown schematically in FIG. 12, controller 260, in this example, includes one or more circuits 310, 320, 330, 340, 350, 360 for operation and control of the door 300. As used herein, "circuit" refers to a complete wired or wireless communications channel for effecting a result between controller 260 and one or more additional components of the door assist system described herein.

In this embodiment, controller 260 includes charging circuit 310 for maintaining a desirable power level in a power supply. In this embodiment, the power supply may comprise local battery 428 connected between the motor 420 and the charging circuit 310, wherein the local battery 428 is further connected to a primary energy supply, such as a vehicle battery 400, desirably through the charging circuit 310. The charging circuit 310 may further selectively draw power from the vehicle battery 400 to ensure that the vehicle battery 400 is not drained by charging the local battery 428.

As further shown in FIG. 12, controller 260, in this example, includes a detection circuit 320 for stopping the motor 420 if movement of the door 300 is obstructed. For example, if the door 300 moves into a position where it is blocked by an obstacle for a preset period of time, then detection circuit 320 provides a signal to motor 420 to discontinue further motion and/or cut power to motor 420. Following deactivation of the motor 420, a user can either manually operate the door 120 or reverse the door under power assist.

Controller 260 may additionally include a cessation circuit 330 for stopping the motor 420 if door operation exceeds a maximum time threshold. For example, cessation circuit 330 may be operable to provide a signal to motor 420 to discontinue further motion and/or cut power to motor 420 should door operation exceed a preset time threshold, such as a time required to reach a desirable opening threshold of the door 300.

Controller 260 may additionally include a position circuit 340 for determining a relative position of the door 300. To facilitate operation of position circuit 340 as described, controller 240 may be connected relative to a door position sensor 366 connected with respect to the position circuit 340, as shown schematically in FIG. 12. Position circuit 340 is preferably utilized to set and maintain presets for door operation. That is, a user may program a desired position for the door 300 to arrive at a fully opened position.

In addition, controller 260 may further include an override circuit 350 permitting the inner door switch, or a dedicated lockout switch as described above, to override the outer door switch. Such operation may be particularly desirable in an emergency scenario whereby users inside the vehicle seek to prevent operation of the door 300 by a person or persons outside of the vehicle.

As briefly described above, controller 260 communicates with respect to one or more safety systems that are positioned in association with the door 120. Accordingly, controller 260 may further include a safety circuit 360 for actuating or stopping the door following an emergency input. A safety switch, such as safety switch 246 described above, for example, may be connected or positioned along or relative to the door and electrically connected with respect to the safety circuit 360. In addition, controller 260 may include a sleep mode wherein the controller 260 will only draw a minimal amount of power when the door is not being activated.

As shown schematically in FIG. 12, the controller 260 may further include a status display 380 indicating at least one of battery capacity, battery charging, safety switch activation, door switch activation and door position. The status display 380 may comprise indicator LEDs, an external display, an integrated LCD display and/or any other suitable status display for conveying at least the listed information. Status display 380 is preferably multifunctional and may further be used as a debugging tool for the motorized door assist system. The status display 380 may indicate a battery capacity, particularly while the door is moving. For example, a series of bars may be lit to represent the battery capacity remaining and/or exhausted. The status display 380 may indicate battery charging status. For example, a series of upwardly cascading lights may represent charging status. The status display 380 may indicate safety switch operation; for example, one or more lights may flash rapidly. The status display 380 may indicate a door open or door closed condition. For instance, the lights may flash in a predetermined manner. In addition, the status display 380 may confirm programming steps. For instance, following programming of a preferred door stop increment, the lights may go blank for a predetermined amount of time and then reilluminate.

As described above, the door assist system may include programmable options for inputting one or more position presets of the door 30. According to this embodiment, the controller 260 may include a memory for retaining one or more trainable stops of the door. The memory may comprise a fixed internal memory, an external memory, a replaceable magnetic memory device such as a diskette, a memory stick or a compact flash card and/or any other suitable memory for retaining such programmable options with the door assist system.

An external programmer may be used to program various features of controller 260. Such features may include: a maximum forward speed; a maximum reverse speed; a minimum speed; a maximum forward acceleration; a maximum reverse acceleration; a maximum acceleration during direction change; a maximum reverse deceleration; a maximum deceleration during direction change; a motor compensation value; and/or an "indoor" mode for a second mode of operation. Additional programmable features may include: scaling for throttle types and values; deadband value around throttle neutral; failband above and below throttle maximum and minimum; setting for a non-linear throttle response; compensation values for load conditions; timing for application of mechanical brake; deceleration parameter for quickstop using key or switch; compensation value for power wire resistance; power down period for controller inactivity; lower current limit bound; upper current limit bound; and/or delay time before controller 260 drops from the upper current limit to the lower current limit.

The external programmer, for example, may be connected with respect to the controller 260 to permit programming of various functions and features described herein. In addition, various functions and/or presets such as door position presets may selectively be programmed by the user without use of the external programmer and yet such functions and/or presets may be retained by the controller 260. To facilitate such programming at least one of the outer door switch and the inner door switch may be connected with respect to the controller 260 to permit actuation of such switch to establish the presets. In operation, a user may open and hold the outer door switch and/or the inner door switch to set a door position preset to a desired position.

As described, a method of operation of the controller 260 for actuating a door having a motor assist and an outer door switch and an inner door switch includes one or more of the following steps. As an initial matter, a user engages a switch, latch, or similarly described means for activating the motor assist. The controller 260 thereafter maintains a desirable current supply to the motor assist; determines a relative position of the door; determines whether movement of the door is obstructed; actuates the door to an appropriate position; determines whether door operation exceeds a maximum time threshold; and/or deactivates the motor assist once the door reaches the appropriate position or the door operation exceeds the maximum time threshold.

In addition, a lockout switch may be connected relative to the controller to override the outer door switch in favor of the inner door switch. The motor assist may be activated in response to a manual activation of an inside door handle. Additionally, should a safety switch be activated, the door may be reversed to a closed position or, preferably, a preset amount. Such reversal permits the safety hazard to be cleared and normal operation of the door may be resumed.

The outer door switch may be activated for a preset period of time thereby activating the motor assist until the door is in a fully open or fully closed position. More particularly, the controller 240 may sense a current position of the door and subsequently move the door to a position opposite the current position.

In another example, the controller 240, 260 may determine a load required to move the door by sensing a current required to move the door. In doing so, the controller 240, 260 may determine an approximate weight of the door during ordinary operation, that is, during operation under normal load conditions on a level surface. Such ordinary operation may determine a baseline or nominal load required to move the door. If subsequent operation requires an adjustment in the desired current for operation of the door, the controller 240, 260 will deliver power the door in a controlled manner to open or close the door in a controlled manner. As such, if the current is outside of a nominal threshold required to move the door, the controller 240, 260 will not permit the door to quickly open or "fling" open if on a downhill side or to open slowly if on an uphill side. Such operation results in safe operation in that it permits an operator an expected response to an open or close activation.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of operation of a controller for actuating a door having a motor assist and an inner door switch and an outer door switch that respectively initiate opening of the door when actuated, the method comprising the steps of:
    operating the controller, the controller uses one or more user-programmable presets that respectively correspond to door operation;
    activating the motor assist based at least in part on the one or more user-programmable presets to move the door between a closed door position and an open door position;
    maintaining a desirable current supply to the motor assist when moving the door between the closed door position and the open door position;
    determining a relative position of the door when moving the door between the closed door position and the open door position;
    engaging a lockout switch; and
    overriding the outer door switch in favor of the inner door switch such that the door cannot be opened via the outer door switch when the lockout switch is engaged.

2. The method of claim 1 further comprising:
    programming the controller using at least one of the inner door switch and the outer door switch.

3. The method of claim 1 further comprising:
    programming the controller using at least one of the inner door switch, the outer door switch, a safety sensor, a door position sensor, a motor current draw, a battery voltage level or an alternator output.

4. The method of claim 1 further comprising:
    activating the motor assist responsive to manual activation of an inside door handle.

5. The method of claim 4 further comprising:
    reversing actuation of the door for a preset amount following activation of a safety switch wherein the safety switch uses pressure sensing to sense the presence of an obstruction between the door and a door frame.

6. The method of claim 1 further comprising:
    activating at least one door switch for a preset period of time; and
    activating the motor assist until the door is in a fully open or fully closed position.

7. The method of claim 6 further comprising:
    sensing a current position of the door; and
    moving the door to a position opposite the current position.

8. The method of claim 1 further comprising:
    programming at least one preset for a door stopping position; and
    retaining the at least one preset within the controller.

9. The method of claim 1 further comprising:
    programming at least one preset for a mode of operation; and
    retaining the at least one preset within the controller.

10. The method of claim 1 further comprising:
    programming at least one preset for a speed of the motor assist; and
    retaining the at least one preset within the controller.

11. The method of claim 1 further comprising:
    programming at least one preset for a current draw of the motor assist; and
    retaining the at least one preset within the controller.

12. The method of claim 1 further comprising:
    determining a nominal current required to operate the door on a level surface under ordinary load; and
    adjusting the desirable current supply if the nominal current is exceeded.

13. The method of claim 1 further comprising:
    determining whether movement of the door is obstructed; and
    reversing actuation of the door in response to a determination that movement of the door is obstructed.

14. The method of claim 1 further comprising:
    determining whether door operation exceeds a maximum time threshold; and
    deactivating the motor assist once the door operation exceeds the maximum time threshold.

15. The method of claim 1 further comprising:
    activating the door to a user-programmable door stopping position; and
    deactivating the motor assist once the door reaches the door stopping position.

16. A vehicle door having a motor assist comprising:
    a dedicated power supply connected with respect to the motor assist;
    a controller connected between the motor assist and the dedicated power supply, the controller maintains a desirable current supply to a motor from the dedicated power supply and determines a relative position of the door, the controller further stops the motor if movement of the door is obstructed or exceeds operation for a preset time threshold; and
    a memory associated with the controller, the memory stores one or more presets of respective door stopping positions wherein the one or more presets are stored using at least one of an operable handle or a switch associated with the vehicle door.

17. The vehicle door of claim 16 further comprising:
    an override switch that deactivates external controls of the vehicle door.

18. The vehicle door of claim 16 wherein the controller is connected between the dedicated power supply and a vehicle battery.

19. The vehicle door of claim 16 wherein the controller reverses the operation of the door upon obstruction of the door.

20. The vehicle door of claim 16 wherein the controller modulates the desirable current supply provided to the motor if the vehicle door is open or closed on an incline.

21. The vehicle door of claim 16 wherein the controller modulates the desirable current supply provided to the motor if the vehicle door is open or closed while overloaded.

22. A system for motorizing at least one door of a vehicle relative to a door frame of the vehicle, the system comprising:

a drive system coupled at least in part to the door and the door frame of the vehicle, the drive system moves the door between a closed door position and an open door position;

a controller coupled at least in part with the drive system to control door operation of the door;

a safety mechanism coupled at least in part with the controller, the safety mechanism uses pressure sensing to sense the presence of an obstruction between the door and door frame and to signal the controller upon sensing the obstruction; and wherein the safety mechanism comprises at least one safety sensor adapted to send a door stop signal to the controller upon sensing an obstruction between the sensor and the door frame, the safety sensor comprises a multi-segmented single pole switch having a plurality of sensor segments coupled by electrical connections, and the sensor segments are positioned to sense obstructions to door closings.

23. The system of claim 22 in which the at least one safety sensor is disposed around an outer perimeter of an internal side of the door.

24. The system of claim 22 wherein the door stop signal is sent to the controller in response to any one of the sensor segments being contacted when the door is closing.

25. The system of claim 22 wherein the controller is adapted to open the door of the vehicle a preselected amount upon sensing of the obstruction to prevent entrapment of the obstruction.

26. The system of claim 22 wherein the controller is adapted to determine the presence of an obstruction located between the door and door frame.

27. The system of claim 26 wherein the controller is adapted to stop a motor of the drive system if the controller determines the presence of the obstruction.

28. The system of claim 22 further comprising a door position sensor adapted to detect movement and position of the door and to relay this information to the controller.

29. The system of claim 28 wherein the door position sensor is mounted proximate a door hinge with one portion attached to the door and another portion attached the door frame.

30. The system of claim 28 further comprising a door open sensor coupled at least in part with the controller to signal the controller to activate the drive system and open the door upon determining that a latch actuator has been actuated.

31. The system of claim 30 further comprising an external close switch mounted to an external side of one of the door or the vehicle, wherein the external close switch is in communication with the controller and, when activated, signals the controller to move the door toward the closed door position; and an internal close switch mounted to an internal side of one of the door or the vehicle, wherein the internal close switch is in communication with the controller and, when activated, signals the controller to move the door toward the closed door position.

32. The system of claim 22 further comprising a door stop switch, the door stop switch when actuated initiates the deactivation of door movement such that the door stops moving either towards the door open position or the door closed position.

33. The system of claim 32 in which no further door movement takes place upon release of the door stop switch.

34. The system of claim 32 in which actuation of the door stop switch prompts the controller to open the door that moved towards the closed door position a preselected amount after movement of the door has been stopped.

35. A method of controlling operation of a door of a vehicle relative to a door frame of the vehicle, comprising:

coupling a drive system at least in part to the door and door frame of the vehicle, the drive system adapted to move the door between a closed door position and an open door position;

coupling a controller at least in part with the drive system;

sensing a position of the door;

receiving a door open command or a door close command at the controller;

initiating opening or closing of the door at preselected speeds based on the command received;

determining the length of time that the open command or close command is continuously received; and directing the drive system to move the door at a relatively slow speed for a predetermined initial time period and to move the door at a relatively faster speed after the predetermined initial time period has ended.

36. The method of claim 35 wherein the relatively faster speed is a full speed for movement of the door until the door reaches a stop position.

37. The method of claim 35 further comprising moving the door to a fully open or closed position if the length that the open command or close command is continuously received exceeds a predetermined time period.

38. The method of claim 35 further comprising mounting a door open sensor to an internal latch actuator or an external latch actuator of the door, wherein the door open sensor is in communication with the controller.

39. The method of claim 35 further comprising sensing the presence of an obstruction between the door and the door frame and sending a door stop signal to the controller upon sensing the obstruction.

40. The method of claim 39 further comprising signaling the drive system to open the door of the vehicle a preselected amount upon the controller receiving the door stop signal.

41. The method of claim 35 further comprising providing the controller with control algorithms for door control operation based on received system inputs and user-programmable settings.

* * * * *